J. W. PEPPLE.
HEADLIGHT.
APPLICATION FILED OCT. 16, 1919.
1,357,113.
Patented Oct. 26, 1920.
2 SHEETS—SHEET 1.
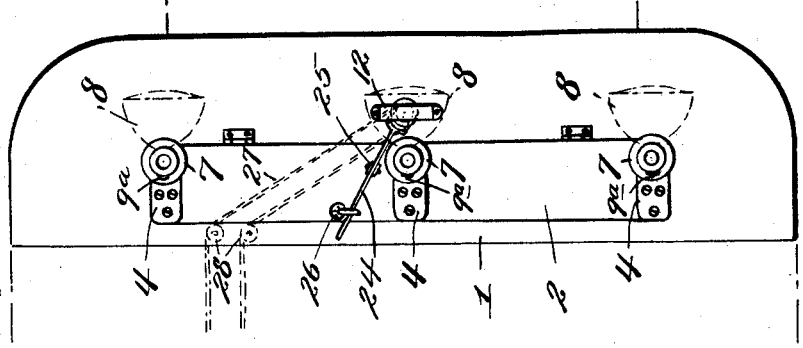
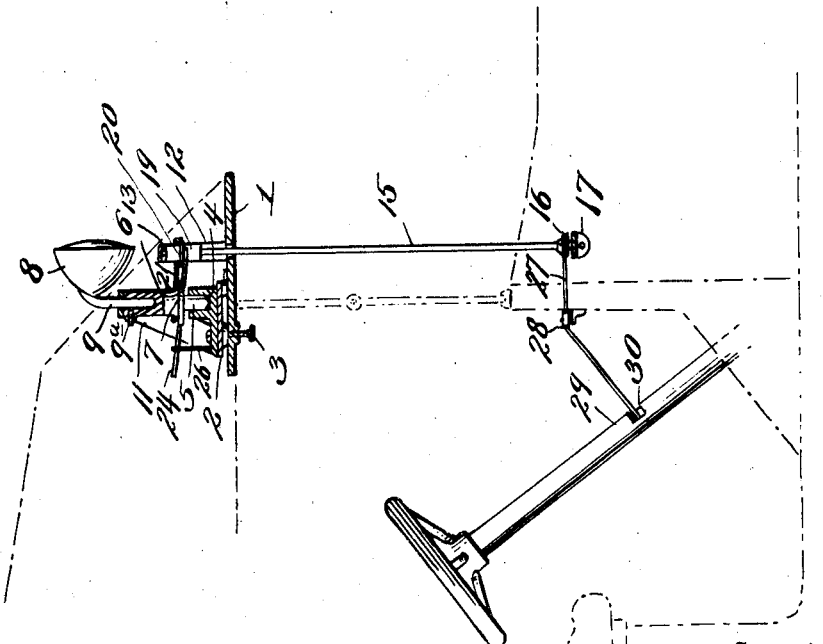
Inventor
John W. Pepple
Witness
By
Attorney

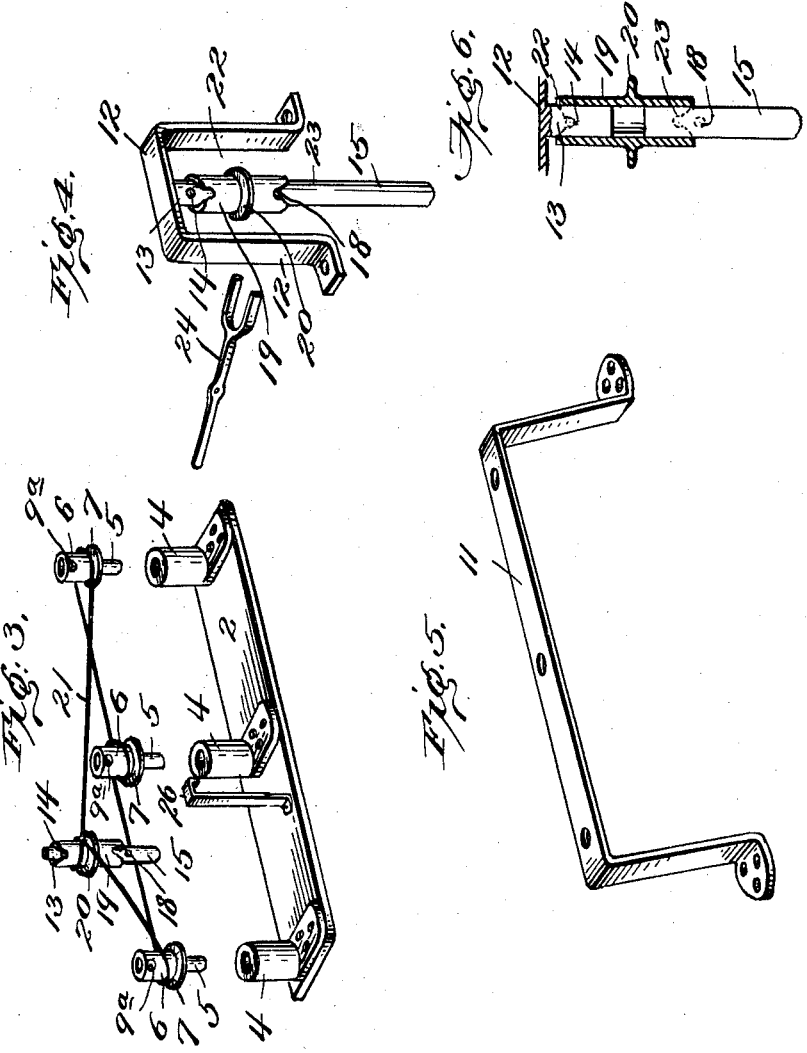

UNITED STATES PATENT OFFICE.

JOHN W. PEPPLE, OF SAN ANTONIO, TEXAS.

HEADLIGHT.

1,357,113.

Specification of Letters Patent.   Patented Oct. 26, 1920.

Application filed October 16, 1919.   Serial No. 330.948.

*To all whom it may concern:*

Be it known that I, JOHN W. PEPPLE, a citizen of the United States, residing at San Antonio, in the county of Bexar and State of Texas, have invented new and useful Improvements in Headlights, of which the following is a specification.

This invention relates to dirigible headlights for motor vehicles.

The objects, briefly stated, are to provide a structure whereby the headlights may be placed in an operative position of relative safety; to provide a structure which will permit the use of strong headlights with a maximum of safety to drivers of other vehicles, and obviate the necessity of employing dimmers for such headlights; to provide headlights which will be readily adjustable as regards elevation; to provide for rendering the dirigible mechanism inoperative if so desired; to provide for the concealment of the operating parts, thereby to insure a most neat and pleasing appearance in combination with the vehicle structure; and to provide mechanism which may be quickly and easily applied to any type of motor vehicle.

With the above objects in view, my invention consists in certain features of structure, combination, and relation which will be set forth as the statement proceeds. What is now considered as the preferred embodiment of my invention is illustrated in the accompanying invention, wherein:

Figure 1 is a side elevation, partly in section, showing a form of my apparatus as applied to an automobile.

Fig. 2 is a plan view showing the lights as arranged on the top of the vehicle.

Fig. 3 is a detail of the belt drive for the rotatable lamps.

Fig. 4 shows in detail a form of the operating rod bracket, sleeve clutch and clutch operating lever.

Fig. 5 is an elevation of the lamp bracing bracket.

Fig. 6 is a detail, partly in section, of the upper portion of the operating rod and of the sleeve clutch.

In the embodiment of my invention illustrated in the drawings a floor member 1, preferably a rectangular body of wood, metal or other suitable material, is affixed to the lower edges of the sides of the top of the vehicle, adjacent the extreme front end end thereof. Hingedly connected to the floor is a lamp-elevating support 2, which is preferably a rectangular body of wood, metal, or other suitable material and which is adapted to be tilted upon its hinges to effect changes in the elevation of the lamps by any suitable means, the form illustrated in the drawings being a thumb screw 3, mounted in a threaded collar in and extending through the floor member 1, the head of the screw projecting beneath the floor member within reach of the occupant of the vehicle, the other end bearing upon the under side of the lamp-elevating support.

In the embodiment illustrated, three lamps are provided, but it is understood that any number of lamps may be used.

Each lamp comprises a base 4, mounted on the lamp-elevating support 2, in which base is rotatably mounted stem 5 of the lamp-supporting shank 6. This lamp shank is formed with a collar 7 for a purpose hereinafter discussed. Lamp reflector 8 has formed thereon stem 9 which is rotatably mounted in supporting shank 6, said supporting shank being provided with a set screw 9ª by means of which the lamps may be adjusted relative to said shank. The lamp stem is prevented from undue lateral movement by means of bracket 11 which is affixed to the lamp-elevating member 2, and has suitable apertures through which the lamp stems pass. A bracket 12 is positioned on the floor member 1 in front of the lamp-supporting structure, which bracket has depending from its top center portion a cylindrical projection 13, which projection has formed on one of its side faces a lug 14. A vertical, rotatable rod 15 carrying at its lower end a sheave 16 is journaled in a bracket 17 within the engine housing of the vehicle. This rod 15 extends upward through the floor member 1 and has formed thereon near the top end a lug 18. Slidably mounted on the upper end of rod 15 and on the lower end of cylindrical projection 13 is a sleeve 19 having formed on its outer face about midway of the length a collar 20. This sleeve 19 constitutes a sheave operatively connected to rotatable lamp shanks 6 by means of a belt 21. Sleeve 19 has its upper and lower edges notched, as indicated at 22 and 23, which notches engage with projections 14 and 18, respectively. Vertical movement is imparted to this sleeve through the medium of a spring-handled forked elevating lever 24, the forks of which partially surround said sleeve and bear on the under side of collar 20. This lever is pivoted on standard 25 affixed to the lamp-elevating support 2 and a detent 26 is carried by elevating support 2 by means of which the handle of said lever may be locked in position. Sheave 16 on the lower end of rod 15 is rotated by means of belt 27 which is carried over suitable idlers 28 mounted on the dashboard of the machine and around the steering wheel shaft of the machine, as indicated at 29, the sleeve of the steering post being recessed, as indicated at 30, to allow the belt to bear upon said shaft.

The operation of my apparatus is as follows: When the steering wheel is turned shaft 15 is rotated which, in turn, oscillates the lamps 8 and directs the light ahead of the path of travel of the machine. When it is wished to adjust the elevation of the lamps and regulate the throw of the light, thumb screw 3 is turned by means of which elevating floor 2 is tilted. When it is desired to disconnect the lamps from the steering post in order that the lamps may remain stationary with respect to the body of the machine, forked lever 24 may be pulled down, by means of which sleeve 19 on the rotatable rod 15 is moved out of engagement with lug 18, thereby allowing the rod to freely rotate in the sleeve and no motion is imparted to the lamps.

I claim as my invention:

1. In a dirigible headlight for motor vehicles, a floor member adapted to be affixed to the top of a vehicle, a base mounted on said floor, a reflector rotatably mounted in said base, means to regulate the elevation of said reflector, a rotatably mounted rod extending upward from the engine hood of the vehicle, a sleeve slidably mounted on the upper end of and adapted to rotate with said rod, a belt connecting said slidable sleeve with said reflector, means to rotate said rod, and means to maintain said sleeve against rotation with said rod.

2. In a dirigible headlight for motor vehicles, a floor member adapted to be affixed to the top of a vehicle, a base mounted on said floor, a reflector rotatably mounted in said base, means to regulate the elevation of said reflector, a rotatably mounted rod extending upward from the engine hood of the vehicle, a sleeve slidably mounted on the upper end of and adapted to rotate with said rod, a belt connecting said slidable sleeve with said reflector, means to rotate said rod, and a forked operating lever mounted on said floor and having its bifurcated ends surrounding said sleeve, whereby the sleeve may be maintained against rotation with said rod.

3. In a dirigible headlight for motor vehicles, a floor member adapted to be affixed to the top of a motor vehicle, an elevation regulating member hinged to said floor, reflectors mounted in bases on said hinged elevation regulating member, means to adjust said elevation regulating member, and a rotatable rod extending upward from the engine hood of the vehicle, and means whereby rotation of said rod will oscillate said reflectors.

4. In a dirigible headlight for motor vehicles, a floor member adapted to be affixed to the top of a motor vehicle, an elevation regulating member hinged to said floor, reflectors mounted in bases on said hinged elevation regulating member, means to adjust said elevation regulating member, and a rotatable rod extending upward from the engine hood of said vehicle, means whereby rotation of said rod will oscillate said reflectors, and means whereby said rod may be operatively disconnected with respect to said reflectors.

5. In a dirigible headlight for motor vehicles, a sheave adapted to be positioned on the steering wheel shaft, a sheave mounted in a bracket in the engine housing, a rod affixed to and extending upward from said sheave, a sheave slidably mounted on said rod at its upper end, a bracket and depending pintle to maintain said sheave and rod against lateral movement, a hinged elevating section, a lamp base mounted on said elevating section, a lamp stem rotatably mounted in said base, a sheave integrally formed on said lamp stem, a belt connecting said sheave on the lamp stem and said slidably mounted sleeve on the upper end of the operating rod, a reflector mounted on said lamp stem, means to adjust said reflector relative to said stem, and a bracket mounted on said hinged elevating section to maintain said reflectors in position relative to said elevating section.

6. In a dirigible headlight for motor vehicles, a floor member adapted to be positioned beneath the top of the vehicle, an elevating member mounted on said floor member, a reflector mounted on said elevating member, means carried by said floor member and said elevating member to adjust said elevating member relative to said floor member, and means connecting said reflector to the steering rod of the vehicle to rotate said reflectors relative thereto.

In testimony whereof I have hereunto set my hand in presence of two subscribing witnesses.

JOHN W. PEPPLE.

Witnesses:
CHAS. S. HYER,
B. F. BEAN, Jr.